United States Patent [19]

Kubacki

[11] 4,091,166

[45] May 23, 1978

[54] BORON TRIFLUORIDE COATINGS FOR THERMOPLASTIC MATERIALS AND METHOD OF APPLYING SAME IN GLOW DISCHARGE

[75] Inventor: Ronald Michael Kubacki, Rancho La Costa, Calif., by Alan M. Lovelace

[73] Assignee: The United States of America as represented by the Administrator of the National Aeronautics and Space Administration, Washington, D.C.

[21] Appl. No.: 807,762

[22] Filed: Jun. 17, 1977

[51] Int. Cl.$^2$ .............................................. B05D 3/06
[52] U.S. Cl. ................................. 428/411; 350/165; 350/175 NG; 427/40; 427/41; 427/164; 428/412; 428/422; 428/447; 428/515; 428/523; 428/538
[58] Field of Search ................ 427/38, 39, 40, 41, 427/163, 164; 428/538, 422, 447, 412, 411; 350/164, 165, 175 NG

[56] References Cited

U.S. PATENT DOCUMENTS

| | | | |
|---|---|---|---|
| 3,811,753 | 5/1974 | Onoki et al. | 350/175 NG |
| 3,847,652 | 11/1974 | Fletcher et al. | 427/41 |
| 4,049,861 | 9/1977 | Nozari | 428/447 |

*Primary Examiner*—John H. Newsome
*Attorney, Agent, or Firm*—Armand McMillan; John R. Manning; Darrell G. Brekke

[57] ABSTRACT

Plastic surfaces can be improved physically and optically by treating them with a plasma of boron trifluoride. The trifluoride can be the sole reactant or be part of a mixture also containing an organic monomeric substance such as perfluorobutene-2 or an organosilane. The boron trifluoride-containing coating can also serve as an intermediate coating between the plasticl surface and a plasma deposited organic polymer.

11 Claims, No Drawings

BORON TRIFLUORIDE COATINGS FOR THERMOPLASTIC MATERIALS AND METHOD OF APPLYING SAME IN GLOW DISCHARGE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

PRIOR ART

Synthetic plastic optical components are generally made from organic resins such as acrylics, polystyrenes, polycarbonates and the like. Although they possess several advantages over the more traditional glass and crystalline materials in terms of weight, resistance to thermal shock and mechanical stresses, cost, etc., they are particularly vulnerable to abrasion, scratching and environmental conditions. This vulnerability often results in impairment, if not complete destruction of their optical capabilities.

Numerous attempts have been made to correct these defects. These attempts have often consisted in applying some scratch resistant layer of material on the components by conventional methods which have included dip coating, electronic beam coating, ultraviolet polymerization and varnishing of the components' surface with a solution of the coating material followed by evaporation of the solvent. While some progress has been accomplished in these manners, the compositions and processes employed have tended to create additional problems with respect to cost, uniformity, adhesion, orientation and directionality requirements between the substrate and the coating composition. To illustrate the shortcomings of the methods of the art, one can consider the dip coating process which consists in immersing a substrate into a coating liquid, removing it from the liquid and drying it. One problem with this process is that the thickness of the resulting film is virtually beyond control. Furthermore, not only do films so prepared not show any durability at thicknesses under about 1 micron, but also they are generally too thick and not sufficiently uniform for use as optical coatings on a substrate having the complex geometry of a lens. Thick coatings ($> 2$ microns) in fact never exhibit both abrasion resistance and anti-reflective properties over the entire range of the visible spectrum ($\sim$ 4000 to 7000 Å).

Recent developments in the art of coating plastic substrates have involved the utilization of plasma or glow discharge polymerization of various organic monomers which include organo-silanes and perfluorobutene-2. These processes have yielded thin uniform optically clear coatings which may possess, depending on the monomer selected and the conditions employed, various desirable properties such as abrasion resistance and antireflectivity.

Thin inorganic coatings have also been applied to thermoplastic elements to achieve increased scratch or abrasion resistance. Thus, Cormia (U.S. Pat. No. 3,458,342), Onoki (U.S. Pat. No. 3,811,753) and Chang et al. (U.S. Pat. No. 3,991,234) all disclose applying a vitreous coating on plastic lenses by simple evaporation, preferably in a vacuum. Dobler (U.S. Pat. No. 3,984,581) and Addis (U.S. Pat. No. 3,953,652), on the other hand, suggest coating a plastic lens under vacuum conditions, using electron bombardment to vaporize a material which is glass in the Addis process and silicon oxide in the Dobler process. The use of elevated temperatures is avoided.

An object of the present invention is to provide a new type of inorganic coating for optical or other thermoplastic substrates. Another object is to provide an intermediate coating which will enhance the adherence of certain organic polymeric materials to said substrates. A further object is to provide a material which can be plasma coated simultaneously with suitable organic monomeric substances to improve the properties of the resulting polymeric coating.

SUMMARY OF THE INVENTION

It has now been discovered that these and other objects which will become apparent as the process of the invention is described, can be accomplished by subjecting a plastic substrate to a boron trifluoride low temperature plasma. The process may be used to form a single inorganic coating of the material on the plastic surface or to form a coating which combines the boron trifluoride with an organic polymeric coating substance. Alternately, the coating obtained by exposure to a boron trifluoride plasma may serve as an intermediate binding layer between the plastic and an outer organic polymeric coating.

DETAILED DESCRIPTION

The coating processes that constitute the present invention may be carried out in any of the plasma reactors described in U.S. Pat. No. 3,847,652. The configuration actually employed for the preparations disclosed in the present specification involved an internal electrode parallel plate arrangement deposition system, with the deposition taking place within the plasma between the electrodes. The reactor, 25.4 cm in diameter and 30.5 cm long, was connected to a liquid nitrogen trap in train with a vacuum pump. Except as shall be otherwise noted, the reactor and its accessory equipment were set up and operated substantially in the manner described in U.S. Pat. No. 3,847,652.

The plastic material to be coated, e.g., polished cast sheet stock of a bisphenol A-phosgene polycarbonate resin, can be cleaned before coating, although this was found not to be necessary in the case of boron trifluoride coating due to the high adhesion of that substance to the plastic substrate. In any event, the cleaning, when done, generally consisted in (1) dipping the plastic pieces in Freon solvent T-WD 602, a water dispersion of trichlorotrifluoroethane having an initial boiling point of 47° C at 760 mm; (2) rinsing them in a second solvent, e.g., trichlorotrifluoroethane; and (3) degreasing them in vapors of the latter liquid. Other established techniques such as pretreatment of the plastic surfaces with water, ammonia, oxygen and the like can also be advantageously employed to enhance the properties of some of the films that can be produced by the process of the invention.

The coating process is initiated by positioning the plastic substrate near the center of the reactor in an aluminum frame supported by Teflon legs. The reactor is evacuated to a background pressure 0.67 N/m² of mercury and the coating agent allowed to flow in at a suitable rate and pressure. Radio frequency power, e.g., at 13.56 MH$_z$, is then applied either continuously or, if desired, in a pulsed mode, for example in an on-off cycle of 1.5 millisecond. Although a large number of power settings and pressure combinations can be employed to achieve some coating of $BF_3$ on plastic substrates, preferred pressures and power settings range between about 9.3 to 20 $N/m^2$ and 30 to 75 W, respectively.

The boron trifluoride coating obtained in this manner can serve as the sole protection of the plastic surface or, alternatively, it may serve as a base upon which organic polymeric coatings are deposited to augment the protection afforded to the plastic surface and to increase the adhesion of said organic polymeric coatings to the plastic surface. These organic coatings may be applied in any conventional manner but plasma deposition is preferred for the obtention of thin transparent uniform films of controlled thickness. Among the materials that can be used to overcoat the boron trifluoride film are: perfluorobutene-2; organosilanes such as vinyltrichlorosilane, tetraethoxysilane, vinyltriethoxysilane, hexamethyldisilazane, tetramethylsilane, vinyldimethylethoxysilane, vinyltrimethyoxysilane, tetravinylsilane, vinyltriacetoxysilane, and methyltrimethoxysilane; ethylene-nitrogen gas mixtures, and the like. These materials may be employed singly or in any combination desired.

A further alternative to employment of the boron trifluoride coating as an intermediate film between the plastic surface and the outer organic polymeric coating, is to combine the boron trifluoride with the organic monomer gas and carry out the deposition of a film with that mixture.

Finally, any coating thus obtained can be further treated in a plasma of inorganic gas or vapors, including nitrogen, oxygen, ammonia and the like, to convert as much of the coating substance as possible to oxides, nitrides and other appropriate resistant linkages.

Examples will now be provided to illustrate specific non-limiting embodiments of the processes just described.

EXAMPLE 1

A piece of optically clear polymethylmethacrylate was placed in a boron trifluoride plasma in an apparatus of the type already described. The pressure of boron trifluoride, the lone reactant, was set at 9.3 $N/m^2$ and the power, at 50 W. Under these conditions, a clear film was deposited onto the substrate at a rate in the order of about 0.25 to 0.50 Angstrom per second. The film, even at thicknesses as small as 600 A for example, exhibited a strong blue color, indicating an index of refraction smaller than that of the polymethylmethacrylate (1.492 $N_B$) with good uniformity. Adhesion of the film to the substrate was excellent as determined by tape pull test in accordance with MIL-SPEC C675A. The film however lacked durability in that on wiping with lens cleaning tissue, severe scratching and smearing occurred. This latter shortcoming as well as the low deposition rate achieved can be improved by varying the pressure and the power employed. The film obtained is advantageously used as an intermediate layer to increase the adherence of polymerized organic films such as polyperfluorobutene-2 to the plastic surface.

EXAMPLE 2

In this preparation, boron trifluoride was mixed with nitrogen gas in a ratio of 2 to 1. The total pressure was about 20 $N/m^2$ and the power at 35-75 W. A blue film was obtained and, again, at a very low deposition rate. Infrared spectrum data showed absorption at the B-N bond wavelength. Adhesion of the film to the substrate was very good while durability was poor. The thickness of the film was measured by interferometry. It was thus determined that at 35 watts of power, the deposition rate was 0.62 A per second. The coating showed signs of incipient opacity at power settings greater than 60 watts.

EXAMPLE 3

In this preparation, boron trifluoride was deposited in combination with perfluorobutene-2. The total pressure of the gas mixture was 20 $N/m^2$ and their ratio, 2 to 1 respectively. The power used was 50 W. Under these conditions, the rate of deposition increased to about 2 A/second and the film obtained showed good adhesion and moderate durability. The coating however did not pass a hand cleaning test with lens tissue.

A comparison of infrared spectra taken from the present film and from one prepared with perfluorobutene-2 as the sole reactant indicated that while both coatings showed one absorption peak at 9 $\mu$ (C-F), that obtained from the film of the present example was considerably larger. Incorporation of boron was also evident.

EXAMPLE 4

The plasma coated plastic substrate of Example 3 was given a nitrogen post-treatment which consisted in evacuating the apparatus to the background pressure and creating a nitrogen plasma for 500-700 seconds at a pressure of 13.3 $N/m^2$ and a power of 50 W. The durability of the treated film was markedly improved. The product successfully passed the tape pull test for adhesion. It was also free of degradation after having been subjected to 20 and 40 rubs with an eraser under 2.2 psi pressure, as specified by MIL SPEC-C-675A. This data, according to the standard procedure, was obtained by visual inspection of the coating, as the specification requires. Further, inspection under 40 magnification and white-light illumination failed to detect any degradation. Also, immersion for up to 24 hours in distilled water or in Freon TF (trichlorotrifluoroethane) and acetone showed the coating to be insoluble.

Although the present invention has been disclosed generally in terms of its preferred parameters and embodiments, it will be understood that many variations in compositions and processes can be carried out by the man skilled in the art without departing from its spirit and scope as defined by the following claims.

What is claimed is:

1. A method for depositing a single layer coating on a plastic substrate, comprising the step of subjecting the substrate to bombardment by boron trifluoride in plasma form.

2. A method of claim 1 wherein the boron trifluoride is employed at a pressure within the range of 9.3 to 20 $N/m^2$ and the plasma is maintained by a radio frequency voltage within the range of about 30 to 75 watts.

3. The method of claim 1 wherein the boron trifluoride plasma comprises a nitrogen-containing gas.

4. The method of claim 1 wherein the boron trifluoride plasma comprises an organic monomeric substance.

5. The method of claim 1 wherein the single layer coating obtained is further subjected to a plasma of an organic monomeric substance.

6. The method of claim 5 wherein the organic monomeric substance is selected from the group consisting of organosilanes and perfluorobutene-2.

7. The method of claim 6 wherein the coated substrate is further treated in a nitrogen plasma.

8. A plastic surface coated with a layer of plasma deposited boron trifluoride.

9. The boron trifluoride coated plastic surface of claim 8 which carries an outer layer of a plasma polymerized organic monomeric compound.

10. The plastic surface of claim 9 wherein the outer layer consists of a plasma polymerized mixture of an organic monomeric compound and boron trifluoride.

11. The plastic surface of claim 9 which has been subjected to a further treatment by a nitrogen plasma.

* * * * *